Aug. 6, 1935.  T. V. BUCKWALTER  2,010,057
AXLE ASSEMBLY AND METHOD OF DISASSEMBLING SAME
Filed Jan. 16, 1933
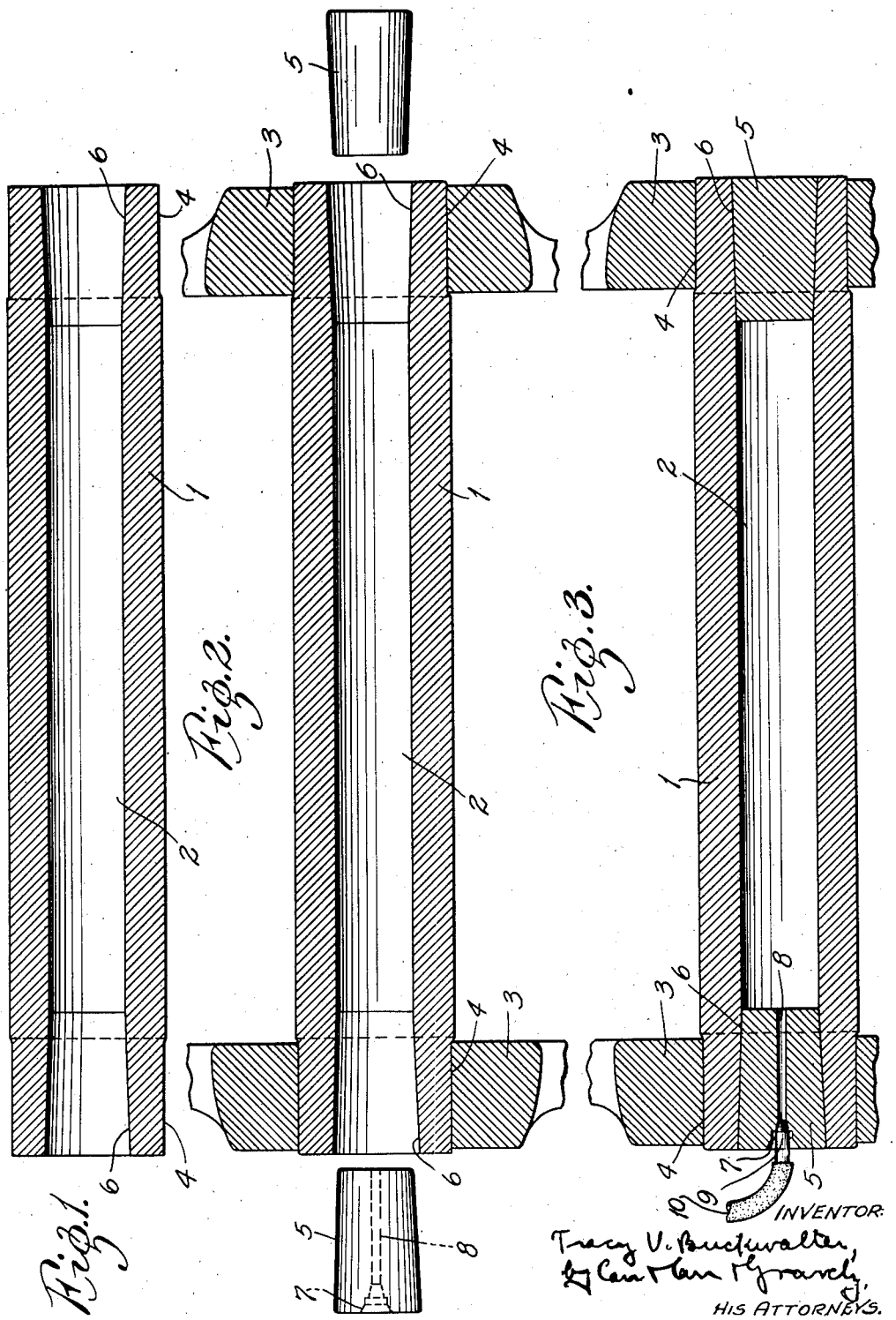

Patented Aug. 6, 1935

2,010,057

UNITED STATES PATENT OFFICE 2,010,057

AXLE ASSEMBLY AND METHOD OF DISASSEMBLING SAME

Tracy V. Buckwalter, Canton, Ohio, assignor to The Timken Roller Bearing Company, Canton, Ohio, a corporation of Ohio Application January 16, 1933, Serial No. 651,923

5 Claims. (Cl. 295—36)

My invention relates to axles for locomotives, railway cars and the like. Its principal objects are to provide for adequate heat treatment, to insure tight mounting of the wheels on the axle, to facilitate dismounting and replacement of the wheels on the axle, to provide for thorough inspection of the axle and to obtain advantages hereinafter appearing. The invention consists principally in forming the axle with a tubular bore extending therethrough and of sufficient diameter to insure thorough heat treatment of the metal; it also consists in press-fitting said wheels on the ends of said hollow axle and then reinforcing said ends with plugs fitting tightly in the ends of the bore; it also consists in forming a passageway leading from the hollow interior of said axle and adapted for connection to a source of hydraulic or like pressure, whereby pressure may be applied in said bore for testing the axle and whereby also one of the end plugs may be forced loose and removed and access obtained to the inner end of the other plug for dislodging it also. It also consists in the parts and combination of parts and in the process of assembly hereinafter described and claimed.

In the accompanying drawing illustrating my wheel and axle assembly and process, wherein like reference characters indicate like parts wherever they occur, Fig. 1 is a longitudinal sectional view of the tubular axle of my invention, Fig. 2 is a similar view of said axle with wheels mounted on the ends thereof and plugs ready for insertion in the ends thereof, and Fig. 3 is a similar view showing the parts assembled and a hose connected to the hollow plug for carrying out the testing or disassembling process.

It is common practice nowadays in assembling railway car and locomotive axle constructions to use solid axles and press the wheels on the ends thereof with a heavy hydraulic press-fit. The use of a solid axle involves difficulties in the heat treatment thereof, does not make any special provision for testing the axle, and the metal in the central portion of the axle operates very inefficiently. On the other hand, a wheel that is heavily press-fitted on a tubular axle is liable to work loose.

According to the present invention, the axle 1 is made with an axial bore 2 extending from end to end thereof and the wheels 3 are press-fitted on the ends thereof in accordance with the usual or other suitable practice, the wheels being preferably of standard dimensions and the axle dimensions conforming to the wheels. For instance, with a locomotive driving axle, the bore of the wheel center and, therefore, the outside diameter of the end portions 4 of the axle may be eleven and one-half inches. In such case, the axial bore 2 of the axle may be five and one-half inches in diameter; that is, the diameter of the bore of the axle is roughly double the wall thickness of the axle. While so large a bore reduces the strength of the axle slightly, it very greatly facilitates and improves the heat treatment of the axle and effects a great decrease in the weight of the axle. So large a bore also has the effect of enabling the wheels to be mounted with a lighter pressure than is required for press-fitting the same wheel on a solid axle; but, on the other hand, the wheel on the tubular axle is likely to loosen before long.

To prevent such loosening, a solid plug 5 is tightly fitted in each end of the axle within the hub of the wheel. Preferably the plug 5 has a slight taper toward its inner end; and the ends 6 of the axle bore flare out slightly conformably to such taper. These plugs 5 are forced or pressed into the ends of the axles after the wheels are mounted thereon, or they may be "frozen" or cooled to decrease their diameter and inserted in place while "frozen". The effect of the solid plug fitted tightly into the bore of the axle is to tighten the fit of the wheel onto the axle and at the same time reinforce the ends of the axle so as to make them operate as if they were solid.

The outer face of each plug 5 has a conical depression 7 at its center of proper size and shape to receive and cooperate with the center of the standard lathe in common use.

The axle is provided with a passageway leading from the hollow interior thereof and adapted to communicate with a source of hydraulic or like pressure. Preferably, this passageway 8 is formed at the axis of one of the end plugs 5, the outer end of the passageway being tapped to adapt it for connection with a threaded nipple 9 or the like on the end of a section of hose 10 leading to a source of hydraulic or other fluid pressure.

By this arrangement, hydraulic pressure may be applied to the hollow interior of the axle for such purposes as testing the axle or dismounting the wheels. If there are any cracks or openings in the axle, the same will be indicated by the escape of the pressure fluid. If it is desired to remove the wheel, sufficient pressure is applied inside the axle to loosen one of the end plugs thereof, whereupon the grip of the wheel on the axle loosens slightly and the wheel can be removed more readily in the same manner but with less pressure than required in present day practice. Likewise, the removal of the loose plug at one end affords access to the inner end of the plug at the other end by means of a bar or like instrument inserted through said open end. The second plug is loosened with the bar and removed and then the second wheel is readily removable. In consequence of the relatively light endwise pressure required to mount and remove the wheel, the wheel center does not suffer appreciably from scoring and galling and, therefore, may be mounted and dismounted repeatedly.

What I claim is:

1. A wheel assembly comprising an axle with a relatively large axial bore extending therethrough with its ends slightly flared, wheels seated tightly on the ends thereof, and solid tapered plugs press fitted in the ends of said bore inside the hubs of the wheels, said axle having a passageway communicating with its bore and adapted for connection with a source of fluid pressure.

2. A wheel assembly comprising an axle with a relatively large axial bore extending therethrough with its ends slightly flared, wheels seated tightly on the ends thereof, and solid tapered plugs press fitted in the ends of said bore with their outer ends substantially flush with the ends of the axle and their inner ends inwardly of the wheel seats, one of said plugs having an opening extending longitudinally therethrough and adapted for connection with a source of fluid pressure.

3. The process of dismounting wheels press-fitted on tubular axles having solid plugs in the ends thereof, which comprises removing one of said plugs by pressure applied to the interior of said axle to reduce the tightness of the fit of the corresponding wheel on said axle and afterwards removing the second plug by force applied thereto through the open end.

4. The process of dismounting wheels press-fitted on tubular axles having solid plugs in the ends thereof, which comprises removing one of said plugs by pressure applied to the interior of said axle to reduce the tightness of the fit of the corresponding wheel on said axle and afterwards removing said wheel.

5. The process of dismounting wheels press-fitted on tubular axles having plugs in the ends thereof, which comprises applying fluid pressure to the interior of said axle to loosen one of the plugs, removing the loosened plug and afterwards removing the second plug with an instrument inserted in the open end of said axle.

TRACY V. BUCKWALTER.